Dec. 18, 1962 B. H. HAMILTON 3,069,612
CURRENT SUPPLY APPARATUS
Filed Sept. 29, 1959
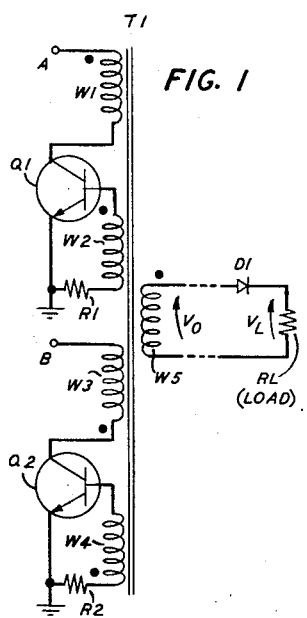
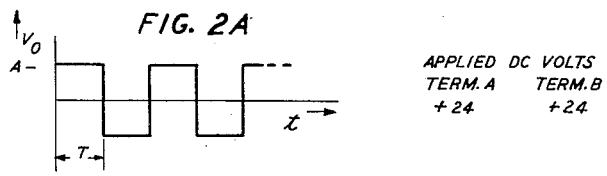
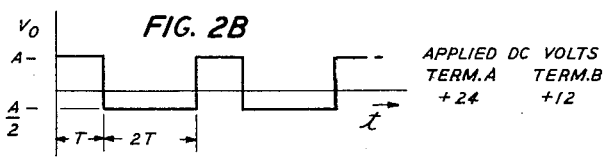
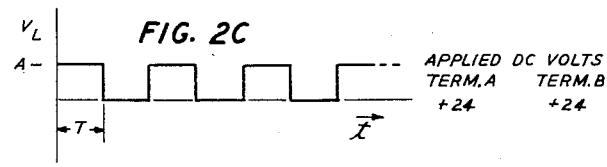
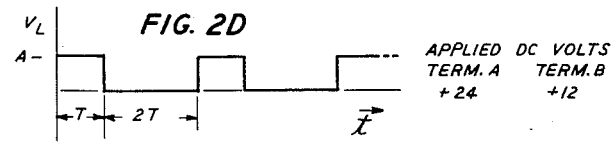
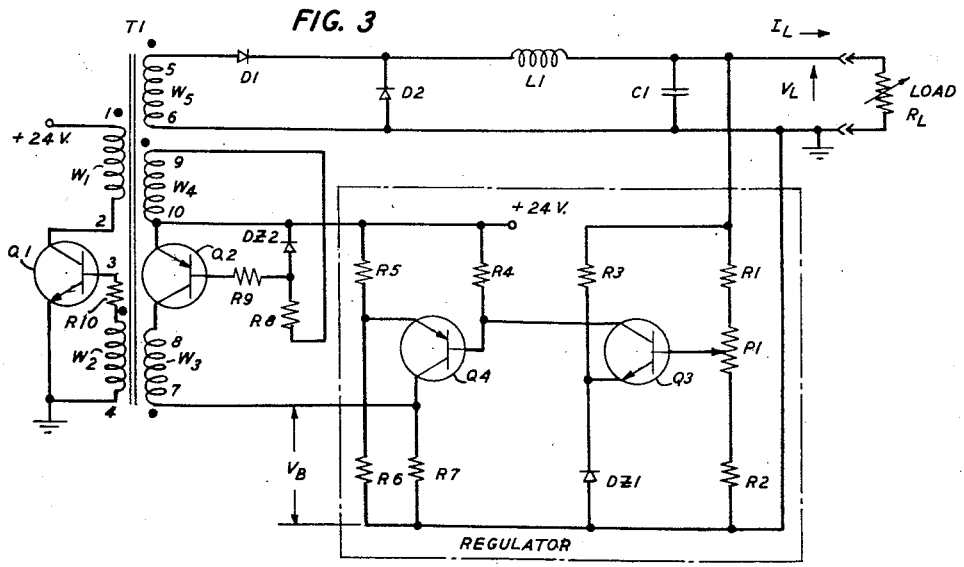
INVENTOR
B. H. HAMILTON
BY
ATTORNEY 3,069,612
Patented Dec. 18, 1962

3,069,612
CURRENT SUPPLY APPARATUS
Billy H. Hamilton, Summit, N.J., assignor to Bell Telephone Laboratories, Incorporated, New York, N.Y., a corporation of New York
Filed Sept. 29, 1959, Ser. No. 843,285
5 Claims. (Cl. 321—2)

This invention relates to current supply apparatus and more particularly to apparatus for controlling the supply of voltages from a voltage source to a load.

An object of this invention is to provide means for transforming a unidirectional voltage to a specified higher or lower unidirectional voltage, and regulating the transformed voltage to minimize voltage changes in a connected load.

In accordance with this invention this objective is achieved by the combination of a transistor-magnetic core inverter circuit and a transistor amplifier in which the unidirectional input voltage to one of a pair of transistors of the inverter is controlled by the output voltage of the amplifier which, in turn, is responsive to any tendency for the load voltage, the rectified output voltage of the inverter, to change from a desired constant value.

The nature of the invention and its distinguishing features and advantages will be more clearly understood from the following detailed description and the accompanying drawings in which:

FIG. 1 is a schematic representation of a conventional inverter-rectifier circuit;

FIG. 2 is a graphical representation of the output voltage waveforms, prior to and after rectification of the inverter output, of a conventional inverter circuit and an inverter circuit modified in accordance with the invention; and FIG. 3 is a schematic representation of a regulated inverter-rectifier circuit embodying the invention.

Referring now to FIG. 1, the conventional transistor core inverter circuit is normally shown with terminal A connected to terminal B and both terminals connected to a positive voltage, for example, 24 volts. The core of transformer $T_1$ has a rectangular hysteresis loop characteristic and, therefore, saturates sharply. The circuit functions in the manner of a free running multivibrator. With transistor $Q_1$ conducting, 24 volts is applied to winding $W_1$. Current flowing through winding $W_1$ is effective to induce voltages in windings $W_2$ and $W_4$ of such polarity and magnitude as to maintain transistor $Q_1$ in a state of conduction and transistor $Q_2$ in a state of non-conduction. As the magnetic flux in the core of transformer $T_1$ increases by reason of continued current flow through winding $W_1$, the core approaches a saturated condition with the result that there is substantially no further increase in the magnetic flux in the core and substantially zero voltages are induced in the windings $W_2$ and $W_4$ to thereby render both transistors $Q_1$ and $Q_2$ substantially nonconducting. As the magnetomotive force falls from a value sufficient to effect saturation of the core to a zero value the magnetic flux present in the core is reduced. This reduction in magnetic flux is effective to induce voltages in windings $W_2$ and $W_4$ having polarities which are opposite to those of the previously induced voltages so that transistor $Q_1$ is maintained in a state of nonconduction and transistor $Q_2$ is caused to conduct. When transistor $Q_2$ starts to conduct the previously described operation is reversed so that current from the 24 volts supply source now flows through transistor $Q_2$ and winding $W_3$. When saturation of the core is reached in the other direction transistor $Q_2$ again becomes nonconducting and transistor $Q_1$ is caused to conduct to thereby initiate another cycle of operation of the inverter circuit.

Two voltage pulses of opposite polarity are induced in the winding $W_5$ for each complete cycle of operation of the inverter circuit to provide an alternating voltage output. This output has a substantially rectangular wave pattern, as shown in FIG. 2A, and the period of each half cycle is proportional to the time required for the core of transformer $T_1$ to become magnetically saturated after each reversal of the conducting conditions of transistors $Q_1$ and $Q_2$. The amplitude A, of voltage $V_0$ is proportional to the voltage applied to terminals A and B. The period, T, of a half cycle is inversely proportional to this same voltage.

In accordance with the invention, a specific embodiment of which is shown in FIG. 3, the terminals A and B are separated, a fixed unidirectional voltage (24 volts) is applied to the $Q_1$ stage, a unidirectional voltage of variable magnitude is applied to the $Q_2$ stage (24 volts minus $V_B$) and output winding $W_5$ is connected to the half wave rectifier type of load shown in FIG. 1. By this means, separate control of the amplitude and duration of alternate half cycles is obtained. As the input voltage to the $Q_2$ stage is reduced from 24 volts, the amplitude decreases and the period T, increases for the negative output half cycle. The resulting output voltage waveform at winding $W_5$ is shown in FIG. 2B. With a half-wave rectifier interposed between transformer $T_1$ and load $R_L$ the output voltage to $R_L$ is as indicated in FIGS. 2C and 2D for $V_B$ equal to zero and $+12$ volts, respectively. It is to be noted in FIG. 2D that the average unidirectional load voltage has been decreased by a factor of two. Also, load current is not supplied during conduction of transistor $Q_2$ due to blocking by diode $D_1$. Therefore, transistor $Q_2$ carries only exciting current with no load-component superimposed, and the power dissipation required of transistor $Q_2$ is substantially smaller than that of transistor $Q_1$.

The average output voltage as indicated in FIG. 2D may be regulated or controlled by varying the length of time between pulses of the output wave. This is achieved by means of the regulator-amplifier circuit comprising transistors $Q_3$ and $Q_4$, the output of which is $V_B$. The amplifier causes $V_B$ to be responsive to any tendency for the load voltage $V_L$ to change from the desired constant value. An increase of load voltage, for example, will make the base of transistor $Q_3$ relatively more positive with respect to the potential of the emitter because of the increased voltage drop across resistor $R_2$ and the substantially constant voltage drop across the Zener diode $DZ_1$. This causes the current flowing into the collector of transistor $Q_3$ to increase. The collector current of transistor $Q_3$ is the current flowing out of the base of transistor $Q_4$ and the increase of this base current produces an amplified increase of current flowing into the emitter and out of the collector of transistor $Q_4$ and through resistor $R_7$. The voltage $V_B$ across resistor $R_7$ thus increases to cause the assumed increase of load voltage $V_L$ to be minimized. The increase in voltage $V_B$ increases the duration of the negative half cycle of the inverter output and, thereby, reduces the integrated average value of the positive half cycle of output voltage which is, in fact $V_L$.

Resistors $R_9$ and $R_{10}$ limit the current in the base circuits of transistors $Q_2$ and $Q_1$, respectively. Zener diode $DZ_2$ is required to maintain constant voltage for sustaining conduction of transistor $Q_2$, since the voltage across winding $W_4$ varies as voltage $V_B$ is varied. In the power output circuit, diode $D_2$ provides for continuity of current in the choke $L_1$ during the negative half cycle.

The unidirectional output voltage of the circuit shown in FIG. 3 may be lower or much higher than the input voltage. The invention may be used to advantage where a multiplicity of highly reliable unidirectional output voltages are needed. In such applications a single voltage with battery reserve could be transformed and regulated as needed. This would avoid the need for a reliable alternating-current source or a multiplicity of battery strings.

It is to be understood that the above-described arrangements are illustrative of the application of the principles of the invention. Other arrangements may be devised by those skilled in the art without departing from the spirit and scope of the invention.

What is claimed is:

1. In a current supply apparatus, a source of unidirectional voltage, a magnetic core of saturable magnetic material, first and second winding means linking said core in an inductive relation relative to each other, a pair of switch means each having an effective open and closed operating condition, said first winding means being connected for energization through separate paths each of which includes said voltage source and a separate one of said switch means to effect opposing directions of magnetization of said core, control means for controlling the operation of said switch means to establish opposing operating conditions thereof, said control means being effective in response to saturation of said core to reverse the operating conditions of said switch means, each of said switch means being arranged so as to transfer from one to the other of said operating conditions upon each occurrence of saturation of said core, said second winding means having induced therein an alternating voltage in response to the energization of said first winding means, a rectifier, means for supplying current from said second winding means through said rectifier to a load only during periods when said first winding is energized through the same one of said switch means, means responsive to voltage changes in said load for varying the magnitude of the unidirectional voltage associated with said other switch means to control the magnitude of rectified current supplied to said load and thereby minimize said load voltage changes.

2. A current supply apparatus comprising a transformer having a core of saturable magnetic material and first and second winding means on said core, first and second transistors, a first circuit including a unidirectional voltage source and said first transistor for supplying current to a portion of said first winding means when said first transistor is conducting to thereby produce flux in one direction in said core, a second circuit including a unidirectional voltage source and said second transistor for supplying current to a portion of said first winding means when said second transistor is conducting to thereby produce flux in said core in a direction opposite said one direction, means comprising said first winding means for causing said transistors to become conducting alternately in succession, said second winding means having induced therein an alternating voltage in response to the energization of said first winding means, means for varying the magnitude of the unidirectional voltage in one of said circuits to vary the duration of the alternate half cycles controlled thereby in said induced alternating voltage.

3. A current supply apparatus comprising a transformer having a core of saturable magnetic material and first and second winding means on said core, first and second transistors, a first circuit including a unidirectional voltage source and said first transistor for supplying current to a portion of said first winding means when said first transistor is conducting to thereby produce flux in one direction in said core, a second circuit including a unidirectional voltage source and said second transistor for supplying current to a portion of said first winding means when said second transistor is conducting to thereby produce flux in said core in a direction opposite said one direction, means comprising said first winding means for causing said transistors to become conducting alternately in succession, said second winding means having induced therein an alternating voltage in response to the energization of said first winding means, a rectifier, means for supplying current from said second winding means through said rectifier to a load only during periods when said first transistor is conducting, means for varying the magnitude of the unidirectional voltage in said second circuit for controlling the rectified current supplied to said load.

4. A current supply apparatus comprising a transformer having a core of saturable magnetic material and first and second winding means on said core, first and second transistors, a first circuit including a unidirectional voltage source and said first transistor for supplying current to a portion of said first winding means when said first transistor is conducting to thereby produce flux in one direction in said core, a second circuit including a unidirectional voltage source and said second transistor for supplying current to a portion of said first winding means when said second transistor is conducting to thereby produce flux in said core in a direction opposite said one direction, means comprising said first winding means for causing said transistors to become conducting alternately in succession, said second winding means having induced therein an alternating voltage in response to the energization of said first winding means, a rectifier, means for supplying current from said second winding means through said rectifier to a load only during periods when said first transistor is conducting, means responsive to voltage changes in said load for varying the magnitude of the unidirectional voltage in said second circuit to control the rectified current supplied to said load and thereby minimize said load voltage changes.

5. A current supply apparatus comprising a source of unidirectional voltage, a magnetic core of saturable magnetic material, first and second winding means linking said core in an inductive relation relative to each other, a pair of transistors each having an effective conducting and non-conducting operating condition, said first winding means being connected for energization through separate paths each of which includes a said voltage source and separate one of said transistors to effect opposing directions of magnetization of said core, control means for controlling the operation of said transistors to establish opposing operating conditions thereof, said control means being effective in response to saturation of said core to reverse the operating conditions of said transistors, each of said transistors being arranged so as to transfer from one to the other of said operating conditions upon each occurrence of saturation of said core, said second winding means having induced therein an alternating voltage in response to the energization of said first winding means, a rectifier, means for supplying current from said second winding means through said rectifier to a load only during periods when said first winding is energized through the same one of said transistors, means responsive to voltage changes in said load for varying the magnitude of the unidirectional voltage associated with said other transistor to control the magnitude of rectified current supplied to said load and thereby minimize said load voltage changes.

References Cited in the file of this patent

UNITED STATES PATENTS

| 2,826,731 | Paynter | March 11, 1958 |
| 2,849,614 | Royer et al. | Aug. 26, 1958 |
| 2,953,741 | Pittman et al. | Sept. 20, 1960 |